Inventor:
William H. Meiklejohn,
by Richard C. Speer
His Attorney.

June 13, 1961 W. H. MEIKLEJOHN 2,988,466

MAGNETIC MATERIAL

Filed Nov. 29, 1957 2 Sheets-Sheet 2

Inventor:
William H. Meiklejohn, by Paul A. Frank

His Attorney.

United States Patent Office 2,988,466
Patented June 13, 1961

2,988,466
MAGNETIC MATERIAL

William H. Meiklejohn, Scotia, N.Y., assignor to General Electric Company, a corporation of New York
Filed Nov. 29, 1957, Ser. No. 699,832
5 Claims. (Cl. 148—6.3)

This invention relates to a new magnetic material and, more particularly, to a material from which magnetic bodies may be made which have a single preferential direction of magnetic polarization and a substantially constant or non-diminishing value of rotational hysteresis losses under high magnetic fields, and to a method for preparing such materials.

This application is a continuation-in-part of my copending application Serial No. 554,861, filed on December 22, 1955, now abandoned, and is assigned to the assignee of said application.

Previously known magnetic materials have been most readily magnetized along one particular crystallographic axis and have been equally readily magnetizable in either direction along that axis. The magnetic properties of these previously known materials have been measured and evaluated by several methods, perhaps the best known being the graphical representation of the hysteresis loop obtained when a magnetic field is applied to the magnetic material in such a manner as to cyclically reverse its polarity. The typical hysteresis loop of a typical magnetic material is shown in FIG. 1 of the drawing as will be discussed in greater detail later. As indicated in FIG. 1 the magnetic properties of these previously known materials have been symmetrically reversible, both quantitatively and qualitatively with respect to a given axis of magnetization. Furthermore, these previously known materials have had at least two stable positions in a strong magnetic field.

A magnetic material having only one direction of easiest magnetization and only one stable position in magnetic fields of any strength would be desirable and useful in many applications.

Additionally previously known magnetic materials have exhibited a characteristic behavior when rotated in a unidirectional magnetic field which has generally been referred to as rotational hysteresis. This may be described in the following manner. Assume a body of conventional magnetic material is supported in a unidirectional magnetic field and adapted to be rotated about an axis passing through the body normal to the direction of the field. As the body is rotated about this axis, the direction of magnetic polarization of the body will attempt to remain parallel to the direction of the applied field. If the strength of the applied magnetic field is low, the direction of the polarization of the material shifts very little and with no discontinuous motion which gives rise to loss. As the strength of the applied magnetic field is increased the direction of polarization of the material changes its direction discontinuously during the course of its rotation, producing loss and a peak value of rotational hysteresis. Then as the field is further increased, the polarization of the material follows the field closely with no discontinuous motion and therefore no loss. A typical rotational hysteresis curve for a conventional magnetic material is illustrated in FIG. 7.

As is well known in certain electrical apparatus which involve the rotation of magnetic materials in applied magnetic fields for their operation, such as, for example, so-called "hysteresis motors," the attainment of high hysteresis losses is limited to the relatively narrow value of the applied field which corresponds to the peak on the rotational hysteresis curve for the particular magnetic material involved. A magnetic material having a relatively high, non-diminishing rotational hysteresis loss for higher employed magnetic fields would be desirable for such apparatus.

It is therefore a principal object of my invention to provide a magnetic material having a single preferential direction of magnetic polarization and a substantially constant or non-diminishing value of rotational hysteresis losses under high magnetic fields. A further object of my invention is the provision of a magnetic material having only one direction of easiest magnetization and only one stable position in magnetic fields of any strength.

It is a further object of my invention to provide a method for making such a magnetic material. Other and specifically different objects of my invention will become apparent to those skilled in the art from the following detailed description of my invention, particularly when read with reference to the accompanying drawings in which FIG. 1 is a graphical representation of the hysteresis characteristics of a typical magnetic material;

Figure 8:
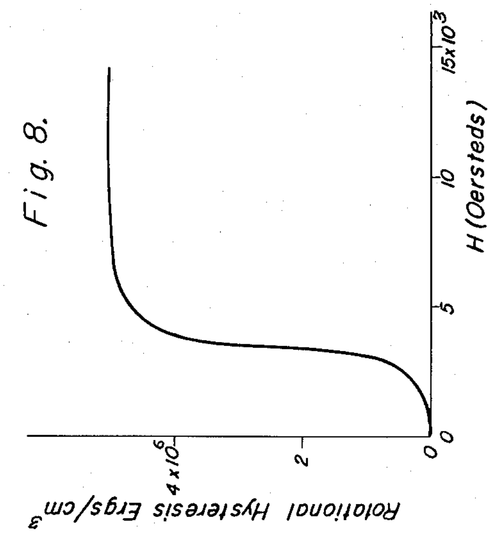
Figure 10:
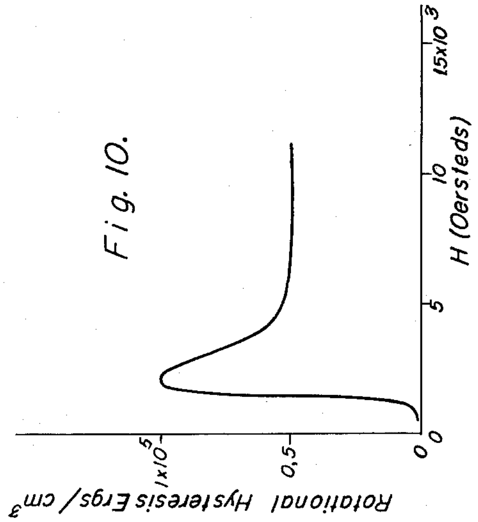
Figure 7:
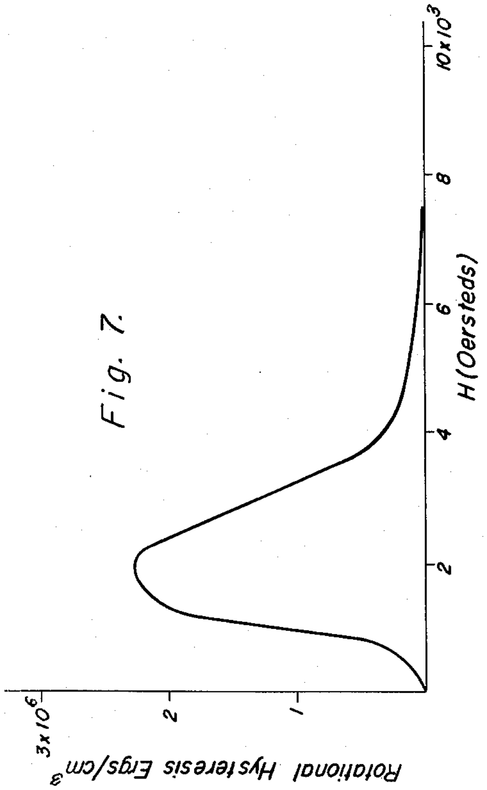
Figure 9:
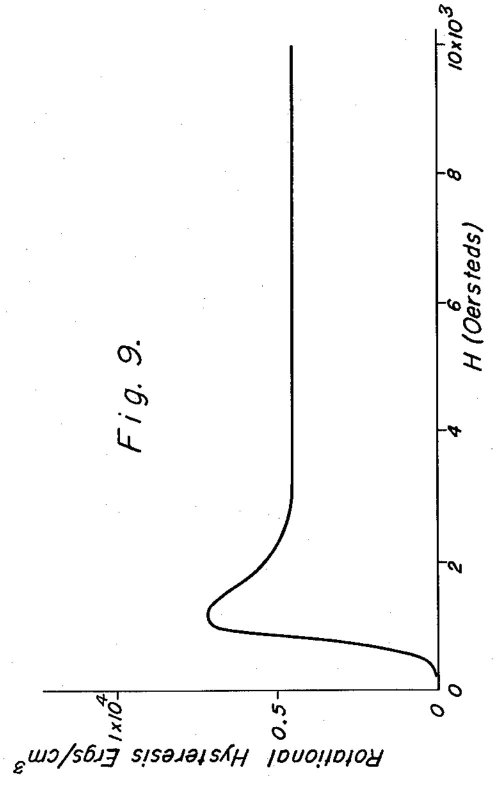

FIG. 7 is a graphical representation of the rotational hysteresis losses of a conventional ferromagnetic material in a unidirectional magnetic field, with respect to the field strength; and FIGS. 8, 9 and 10 are graphical representations, similar to FIG. 7, of the rotational hysteresis losses of three different magnetic materials of my invention in a unidirectional magnetic field with respect to the field strength.

Briefly stated, in accordance with one aspect of my invention, I provide magnetic materials comprising composite metallic bodies consisting essentially of a ferromagnetic metal selected from the group consisting of iron, cobalt and nickel, and an antiferromagnetic material in contiguous and intimate magnetic relationship with said metallic bodies. These antiferromagnetic materials may consist of oxides of the ferromagnetic metals, such as, for example, FeO, CoO and NiO.

In order to more clearly and completely disclose my invention, the following discussion and specific working examples are set forth to be read, as indicated, with figures from the accompanying drawing.

Figures 1, 3, 5:
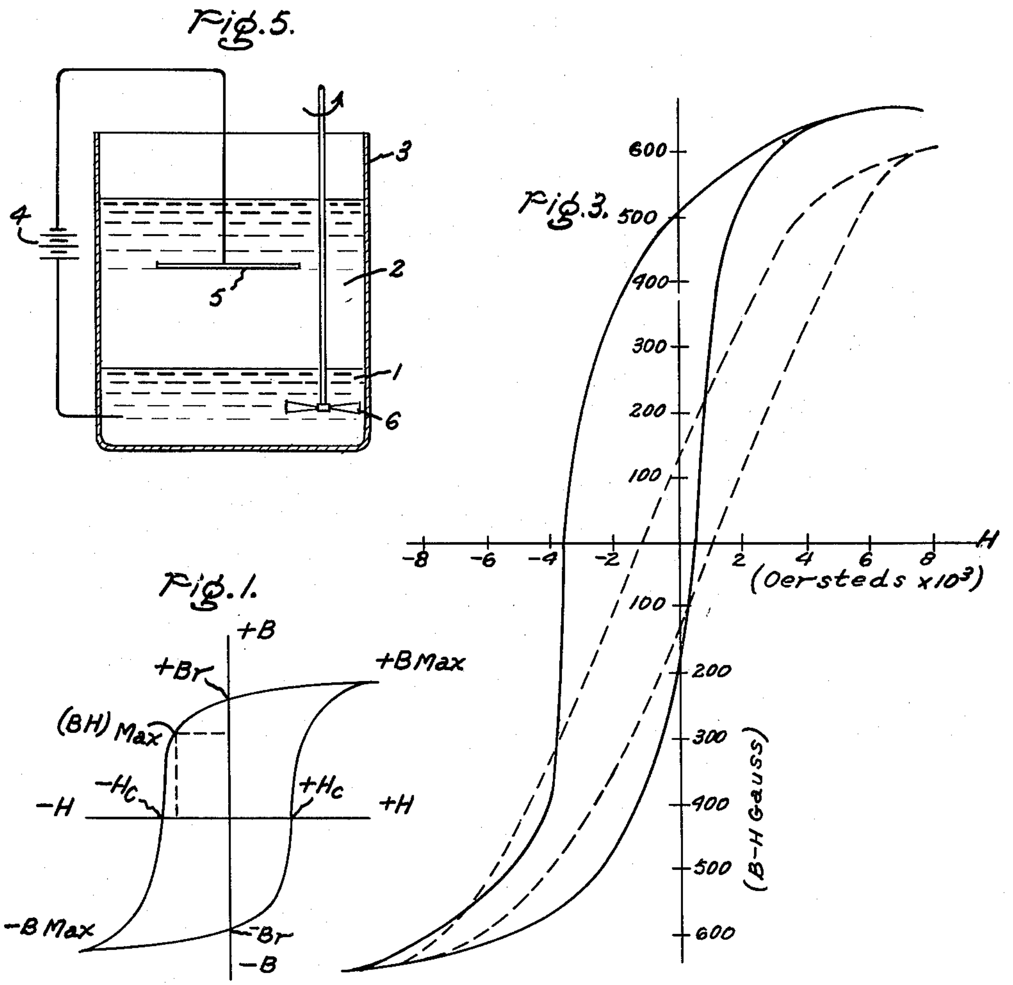
FIG. 3 is a graphical representation of the hysteresis characteristics of a magnetic material of my invention.
FIG. 5 is a schematic representation of apparatus used in practicing one step of a method for preparing a material of my invention.

A representative magnetic hysteresis loop of the previously known typical magnetic materials is shown in FIG. 1 in which the magnetizing field H in oersteds is the axis of abscissas and the magnetic flux density or induction B in gauss is the axis of ordinates. As the field is increased from 0 to higher values of H in what for convenience may be referred to as the positive direction, the magnetic flux density of the material attains a maximum value $+B_{max}$ for a given field. If the field $+H$ is removed, the value of B decreases to $+B_r$. If a field having a reverse direction $-H$ is then applied, the magnetic flux density of the material decreases and crosses the H axis at the value $-H_c$ or as usually expressed $H_c$ and the magnetic flux density becomes $-B_{max}$ as the field is further increased in the negative direction. If the negative direction field is removed, the magnetic flux density of the material correspondingly drops to $-B_r$, which is numerically equal to $+B_r$, and if a positive direction of field is applied, a magnetic flux density approaches and crosses the H axis at the value $+H_c$ which is numerically equal to $-H_c$. As the positive field is increased the magnetic flux density of the material increases to the value $+B_{max}$.

The descending branch of the hysteresis loop between $+B_r$ and $-H_c$ is known as the "demagnetization curve" and serves as a measure of the total magnetic energy of a given material. This is usually expressed as the maximum value of the product of B and H of this portion of the curve, $(BH)_{max}$, as shown in FIG. 1 and is proportional to the maximum amount of magnetic energy that a magnet of a given material can support in an air gap per unit volume of material in the magnet. Therefore, the $(BH)_{max}$ value of a material is customarily used as a direct indication of the strength of magnets of a given size and configuration which may be made therefrom.

Figure 2:
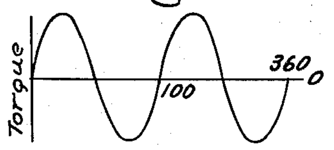
FIG. 2 is a graphical representation of the torque characteristics of a typical magnetic material in a nearly saturating magnetic field.

When a single crystal of a previously known magnetic material such as cobalt, for example, is rotated in a unidirectional magnetic field about an axis perpendicular to the field and with the "c" axis of the cobalt single crystal in the direction of the magnetic field, it has been observed that the torque required to rotate the material is at a stable minimum along the axis of easiest magnetization. The other ferromagnetic elements, iron and nickel, behave in a similar manner. Since these previously known materials have been equally easily magnetizable in either direction along the axis of easiest magnetization, the values of torque plotted against the angle between the applied field and the axis of easiest magnetization produces a sinusoidal curve as shown in FIG. 2 in which $\theta$ equals 0°, 180° (360° is the same as 0°) represent torque values of 0 with a positive rate of change and therefore the directions of easiest magnetization. Furthermore, in the case of the torque curve shown in FIG. 2, it is apparent that these materials, iron, cobalt and nickel, will have two stable positions in a strong field, namely, when $\theta$ equals 0° (or 360°) and $\theta$ equals 180°.

I have discovered that a magnetic material comprising finely divided oxide coated particles of the ferromagnetic metals, particularly cobalt, may be prepared so that the hysteresis loop thereof is displaced along the H axis so that when magnetically polarized in one direction a maximum air gap energy, $(BH)_{max}$, is about 4 million and when polarized in the reverse direction the $(BH)_{max}$ is negligible by comparison. These magnetic properties may be best disclosed with reference to the hysteresis loop as shown in solid lines in FIG. 3 and the torque versus displacement angle $\theta$ graph in FIG. 4.

The particular specimen from which the hysteresis loop measurement and torque characteristics of FIGS. 3 and 4 were determined was prepared in the following manner. About 80 ml. of mercury 1 and 400 ml. of an aqueous solution of cobaltous ammonium sulfate 2 were placed in a container 3 made from an electrically insulating material, in this case, glass. A source of direct current 4 was connected to an anode 5 immersed in the aqueous cobalt solution 2 and to a lead 6 whereby the pool of mercury 1 became the cathode of the electrolytic cell thus formed. The aqueous cobaltous ammonium sulfate solution contained 40 grams of the cobalt salt. An electrical potential of about 4 volts was impressed across the electrolytic cell at a current density at the cathode of about 0.06 amperes per square centimeter for 1 hour as the mercury cathode 1 was agitated by means of a stirrer 6.

During the time the current was permitted to flow, metallic cobalt was electrodeposited in the mercury cathode, and since the solubility of cobalt in mercury is very low, small particles of cobalt were formed in the mercury. At the end of the electrodeposition the current was interrupted and the residual aqueous cobalt electrolyte 2 was decanted from the cobalt bearing mercury. The mercury-cobalt mixture was then heat treated at about 140° C. for about one-half hour. After heat treatment it was found that the size of the cobalt particles had been increased by the heat treatment to about 200 Angstrom units in transverse dimension. The cobalt particles were then partially oxidized in the mercury by means of an agitator which raised the cobalt particles and exposed them to the atmosphere. The oxidized cobalt particles were then separated from the mercury, placed in a container and cooled from room temperature to about −200° C. while subjected to a unidirectional magnetic field of about 10,000 oersteds.

The applied field was then reduced to 0 and applied in a reverse direction, reduced to 0 and reestablished in the original direction a number of times and the hysteresis loop shown in solid lines in FIG. 3 was thereby determined. For purposes of comparison, the hysteresis loop for the same specimen cooled at the same temperature in the absence of the magnetic field is shown in broken lines in FIG. 3.

It will be seen from the hysteresis loops of FIG. 3 that the magnetic material of my invention has a remanence or $B_r$ when magnetically polarized in one direction of about 500 gauss, but when polarized in the reverse direction it has a remanence of only about 150 gauss. Additionally, when polarized in one direction, it has a coercive force ($H_c$) of about 500 oersteds and when polarized in the reverse direction, a coercive force of about 3600 oersteds. The $(BH)_{max}$ or maximum air gap energy of the material of my invention when made to more nearly optimize the energy product was determined to be about 4 million gauss-oersteds for a magnetic flux density of about 2500 gauss in a field of about 2500 oersteds when polarized in one direction and only about 40 thousand gauss-oersteds when polarized in the reverse direction by means of an equal opposite field. Furthermore, the total energy of magnetization of the material of my invention is approximately four times that of cobalt when measured at about −200° C. after cooling in the absence of a magnetic field, as shown by the dashed line hysteresis loop of FIG. 3.

Upon examination of this particular magnetic material, it was found that the particles consisted of substantially spherical particles of cobalt covered by an oxide film consisting of cobaltous oxide which comprised about 25 percent of the total volume of each particle. Furthermore, it has been found that these oxide coated particles may range in transverse dimension from about 100 to 1000 Angstrom units but that 200 Angstrom units is preferable.

Figure 4:
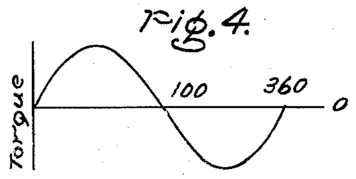
FIG. 4 is a graphical representation of the torque characteristics of a magnetic material of my invention when measured in a field of 10,000 oersteds.

Torque tests were conducted upon this specimen of my invention and the torque values plotted against the angular deflection $\theta$ of the material with respect to a unidirectional magnetic field as shown in FIG. 4. It will be seen that only at $\theta$ equals 0° (or 360°) is the torque at a minimum with a positive rate of change and therefore this material is unique in that it has only one easiest direction of magnetization and only one stable position in a unidirectional magnetic field.

I have found that coherent shaped bodies of this material of my invention may be formed by means of a binder, such as, for example, a plastic and such a body given the gross magnetic properties disclosed previously by cooling in a magnetic field.

Additionally, I have discovered that the biased or shifted hysteresis loop characteristic of my invention is related to the oxide coating and the degree of cooling in a magnetic field. If the cobalt particles are not provided with the previously described oxide film, the material does not display the previously described asymmetry of the hysteresis loop. Further, if the oxide coated particles are not cooled in a unidirectional magnetic field the material does not possess this asymmetry but behaves quite similarly to ordinary cobalt as shown in the broken line hysteresis loop of FIG. 3.

Figure 6:
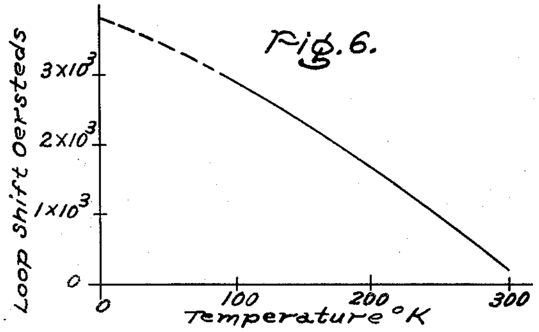
FIG. 6 is a graph showing the relationship between cooling temperatures and the corresponding shift produced in the hysteresis loop of materials of my invention.

It is postulated as a probable theory that the unique behavior of this material depends upon the magnetic relationship between the ferromagnetic cobalt and the cobaltous oxide film and particularly upon a magnetic coupling interaction phenomenon which occurs between the antiferromagnetic cobaltous oxide and the ferromagnetic cobalt at the shared interface. As the cobaltous oxide is cooled from its paramagnetic state above approximately 20° C. to its antiferromagnetic state below approximately 20° C. in a unidirectional magnetic field the interaction takes place that results in the shifted hysteresis loop. It is believed that the coupling effect is increased as the temperature is decreased in the presence of a magnetic field. This probable theory has been at least partially substantiated by the measurement of the amount that the hysteresis loop has been shifted for the material of my invention by cooling to various temperatures below room temperature in a unidirectional magnetic field. This relationship is shown in FIG. 6 in which it may be seen that as the specimen is cooled to progressively lower temperatures in a constant field the hysteresis loop is shifted to a greater extent away from the conventional symmetrical disposition.

In the preparation of the cobalt-cobalt oxide materials by electrodeposition, I have found the following properties and procedural steps to be desirable in order to attain the greatest asymmetry of the hysteresis loop. The cobalt particles should be larger than 50 Angstrom units and smaller than 1000 Angstrom units and preferably about 200 Angstrom units. This may be achieved by heat treatment of the mercury-cobalt mixture described previously for from about 10 minutes at 200° C. to about 1 hour at 100° C. The cobalt particles should each be encased in a film of cobaltous oxide amounting to about 10 or 30 percent, preferably about 25 percent, of the total volume of the material. The material must be cooled from a temperature of about 20° C. or above, to a lower temperature, preferably of the order of 100° K. in a magnetic field sufficiently strong enough to saturate the material, about 10,000 oersteds or greater, for example.

While the preceding disclosure has been specific to the electrodeposition of cobalt into a mercury cathode, I have also found that this magnetic material may be equally well prepared by chemical oxidation and reduction reactions. For example, I have produced powdered metallic cobalt from both commercial "chemically pure" powdered cobalt formate and "U.S.P." reagent grade powdered cobalt formate, by reducing the compounds in a conventional laboratory tube furnace at about 300° C. for about 5 hours under a hydrogen atmosphere. The particles of cobalt so-produced were about 500 Angstrom units in maximum transverse dimension. These particles were then heated in an air oven at 200° C. for about an hour to oxidize their surfaces and then cooled to about −200° C. while subjected to a unidirectional magnetic field of about 10,000 oersteds. When the hysteresis loop of this material was determined under the same conditions as previously set forth, it was found to have substantially identical magnetic properties as the material made by electrodeposition, including, of course, an asymmetrical hysteresis loop.

Additionally, according to my invention nickel may be substituted for cobalt to produce an analogous material. For example, a quantity of powdered substantially pure nickel formate was reduced in a conventional laboratory tube furnace at 300° C. for about 5 hours under a hydrogen atmosphere to produce finely divided metallic nickel powder. The particles comprising this powder were about 500 Angstrom units in maximum transverse direction. This powder was then heated in an air oven at about 200° C. for about an hour, thereby oxidizing the surfaces of these particles. The particles were then cooled to about −200° C. while subjected to a unidirectional magnetic field of about 10,000 oersteds. The magnetic hysteresis loop of this material was determined under the same conditions as previously stated for the cobalt-cobalt oxide material and was found to be asymmetrical. For example, when the material was polarized in one direction it exhibited a coercive force of 420 oersteds, and when polarized in the opposite direction, it exhibited a coercive force of only 370 oersteds.

A quantity of cobalt powder was prepared and partially oxidized according to the electrodeposition procedure previously disclosed and pressed into a coherent cylindrical body about ¼" in diameter and about ¼" long. This body was cooled to −200° C. in the absence of an applied magnetic field and the rotational hysteresis thereof was determined for applied unidirectional magnetic field strength of 2000, 3000, 4000, 5000, 7500, 10,000 and 14,000 oersteds, using a conventional torque magnetometer. The maximum rotational hysteresis values thus obtained were plotted as a function of field strength and the resulting curve is illustrated in FIG. 8.

As started previously, FIG. 7 illustrates a typical rotational hysteresis versus magnetic field curve characteristic of previously known ferromagnetic materials. It will be observed that it is low at low fields, attains a peak value at intermediate fields and at higher fields, decreases to zero. The particular values plotted in FIG. 7 were determined by measuring the rotational hysteresis of cobalt particles electrodeposited in mercury, as previously set forth, and which were identical to said prior particles except that they had not been oxidized.

Upon comparing FIGS. 7 and 8 it will be noted that the important difference between the two curves is that the rotational hysteresis values for high field strengths for the conventional cobalt decrease to zero whereas in the material of my invention illustrated in FIG. 8, a substantially constant or non-diminishing high value is maintained at comparable high field strengths. Furthermore, the magnitude of the peak rotational hysteresis value for the nonoxidized conventional cobalt is quite substantially less than that of the material of my invention.

Similar rotational hysteresis values versus applied magnetic field curves are shown in FIGS. 9 and 10 for nickel-nickel oxide and iron-iron oxide materials. The nickel-nickel oxide material was prepared by the reduction of nickel formate followed by oxidation as previously set forth. A partially oxidized powder was compacted into a ¼" diameter by ¼" long coherent cylindrical body and rotational hysteresis versus applied field strength measurements, substantially identical to those made on the cobalt-cobalt oxide material previously set forth were made and plotted in FIG. 9.

Similarly, commercial "chemically pure" ferrous ammonium sulfate was dissolved in distilled water, in the proportions of about 100 grams per liter and iron particles were electrodeposited therefrom into pure mercury in the aparatus illustrated in FIG. 5 according to the procedure previously set forth for the electrodeposition of cobalt. The iron particles were partially oxidized and separated from the mercury, pressed into a ¼" diameter by ¼" long coherent cylindrical body, cooled to about −200° C. and rotational hysteresis values versus applied magnetic field strength measurements substantially identical to those made on the cobalt-cobalt oxide and the nickel-nickel oxide, were made and plotted in FIG. 10.

In both the nickel-nickel oxide and the iron-iron oxide rotational hysteresis curves shown in FIGS. 9 and 10, respectively, it will be seen that the value of rotational hysteresis attains a finite constant value for high applied magnetic fields and does not decrease to zero. Both the latter curves show a peak value which is probably attributable to the fact that the surfaces of certain particles in the compact were not sufficiently oxidized, or that the oxide films on some of the particles were broken off or otherwise damaged during the compacting step.

From the foregoing it may be seen that I have provided a new magnetic material which is essentially a composite body consisting essentially of a ferromagnetic metal and an antiferromagnetic material which share a common interface and at which interface a magnetic interaction exists which causes these materials to exhibit magnetic properties never before observed in analogous magnetic materials, namely, an asymmetrical hysteresis loop and a substantially constant or non-diminishing rotational hysteresis value at high applied magnetic fields. This may be shown by the fact that the metal oxide coatings disclosed exhibit what may be termed for convenience an antiferromagnetic Curie point or Neel temperature, i.e., these materials are antiferromagnetic below a particular temperature and paramagnetic above said temperature. For example, the Neel temperature of FeO is about −90° C., of NiO about 250° C., and of CoO about 20° C. When the previously disclosed composite materials are heated above the Neel temperature of the particular oxide involved, the oxide transforms from the antiferromagnetic state to the paramagnetic state and the rotational hysteresis of the composite material reverts back to the conventional or previously known characteristic behavior, as illustrated in FIG. 7. Additionally, at temperatures above the Neel temperature for the particular oxide involved, the hysteresis loop of the composite material is symmetrical. In other words, it is necessary that the nonferromagnetic portion of the composite bodies comprising the materials of my invention be in the antiferromagnetic state and not in the paramagnetic state and that there be a common interface shared by the two dissimilar constituents of the composite bodies in order that the magnetic interaction or coupling may take place. As previously stated, it is believed that the coupling effect is increased as the temperature is decreased in the presence of a magnetic field, at least with respect to the shift of the hysteresis loop. This probable theory is supported by the measurement of the amount that the hysteresis loop shifts for the material of my invention by cooling to various temperatures below room temperature in a unidirectional field. This relationship is shown in FIG. 6 in which it may be seen that as the specimen is cooled to progressively lower temperatures in a constant field the hysteresis loop is shifted to a greater extent away from the symmetrical disposition. However, it has been found that the rotational hysteresis characteristics of these materials of my invention are attainable regardless of whether they are cooled in a magnetic field or not provided the non-ferromagnetic constituent is in the antiferromagnetic state.

The magnetic materials of my invention may be used to advantage in low temperature environments, for example, as a biased permanent magnet in cryostatic electrical and electronic circuits and as a differential magnetic switching element in a low temperature apparatus. Additionally, these materials are useful in electrical apparatus which depend upon high rotational hysteresis values for their operation such as hysteresis motors, for example. Other and specifically different uses will occur to those skilled in the art and I do not intend to restrict my invention to these or any other particular uses.

While I have particularly disclosed examples of the materials of my invention in the form of small substantially spherical particles coated by an oxide film, it will be appreciated that this particular configuration may be departed from. For example, certainly oxide coated oblate spheroids and coated disk-like bodies formed from particles flattened during the compacting step are present in the compacted bodies previously disclosed. In addition, other and specifically different methods of making these materials will readily occur to those skilled in the art. I therefore do not intend my invention to be limited in any manner except as defined by the appended claims.

What I claim as new and desire to secure by Letters Patent of the United States is:

1. A composite magnetic body comprising a ferromagnetic metallic portion of from about 100 to 1000 angstrom units in transverse dimension composed essentially of an element selected from the group consisting of iron, cobalt and nickel, and an antiferromagnetic portion selected from the group consisting essentially of iron oxide, nickel oxide and cobalt oxide sharing a common interface with said metallic portion and being magnetically coupled therewith, said composite magnetic body having a substantially constant rotational hysteresis value greater than zero when subjected to high strength magnetic fields.

2. A magnetic body as recited in claim 1 in which said antiferromagnetic film occupies from about 10 to 30 percent by volume of said composite body.

3. A magnetic body as recited in claim 1 in which the average minimum transverse dimension of said composite body is about 200 Angstrom units and the film of cobalt oxide occupies about 25 percent by volume of said composite body.

4. A method of making a composite magnetic body having a substantially constant rotational hysteresis value greater than zero when subjected to high strength magnetic fields comprising, providing a body of from about 100 to 1000 angstrom units in transverse dimension of a metal selected from the group consisting of nickel, iron and cobalt, oxidizing the surface of the metal body to form a substantially continuous integral oxide film thereon, said metal body and said oxide film being magnetically coupled at the common interface, and cooling said metal body and said oxide film to a temperature below the Neel temperature of the oxide film to render said film antiferromagnetic.

5. A method of making a composite magnetic body having only one stable position in an applied magnetic field comprising, providing a body of from about 100 to 1000 angstrom units in transverse dimension of a metal selected from the group consisting of nickel, iron and cobalt, oxidizing the surface of the metal body to form a substantially continuous, integral oxide film thereon, said metal body and said oxide film being magnetically coupled at the common interface, cooling said metal body and said oxide film to a temperature below the Neel temperature of the oxide film to render said film antiferromagnetic, and simultaneously subjecting said metal body and said oxide film to an applied unidirectional field while the cooling is being effected.

References Cited in the file of this patent

UNITED STATES PATENTS

| | | |
|---|---|---|
| 865,687 | Edison | Sept. 10, 1907 |
| 1,669,648 | Bandur | May 15, 1928 |
| 1,919,806 | Schulz | July 25, 1933 |
| 2,002,696 | Kelsall | May 28, 1935 |
| 2,064,771 | Vogt | Dec. 15, 1936 |
| 2,239,144 | Dean et al. | Apr. 22, 1941 |
| 2,487,632 | Bennet | Nov. 8, 1949 |
| 2,499,860 | Hansen | Mar. 7, 1950 |

FOREIGN PATENTS

| | | |
|---|---|---|
| 522,731 | Great Britain | June 26, 1940 |

OTHER REFERENCES

Bozorth: Ferromagnetism, D'Van Nostrand Co., New York, 1951, pages 6 and 470.